US009587575B2

(12) United States Patent
Shiwa

(10) Patent No.: US 9,587,575 B2
(45) Date of Patent: Mar. 7, 2017

(54) CYLINDER-TO-CYLINDER VARIATION ABNORMALITY DETECTING DEVICE

(71) Applicant: FUJI JUKOGYO KABUSHIKI KAISHA, Tokyo (JP)

(72) Inventor: Daiki Shiwa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 187 days.

(21) Appl. No.: 14/641,270

(22) Filed: Mar. 6, 2015

(65) Prior Publication Data

US 2015/0260610 A1 Sep. 17, 2015

(30) Foreign Application Priority Data

Mar. 11, 2014 (JP) ................................ 2014-047264

(51) Int. Cl.
*G01M 15/00* (2006.01)
*F02D 41/14* (2006.01)
(Continued)

(52) U.S. Cl.
CPC ..... *F02D 41/1495* (2013.01); *F02D 41/1456* (2013.01); *F02D 41/1498* (2013.01);
(Continued)

(58) Field of Classification Search
CPC .............. G01M 15/102; F02D 41/0085; F02D 2041/288
See application file for complete search history.

(56) References Cited

U.S. PATENT DOCUMENTS 9,279,378 B2 * 3/2016 Katayama ........... F02D 41/0085
2008/0312806 A1 * 12/2008 Ueda .................. F02D 41/1454 701/103

(Continued)

FOREIGN PATENT DOCUMENTS

JP 2011226363 A * 11/2011 ............ F02D 43/00
JP 2012-031774 A 2/2012
JP 2012-154300 A 8/2012

*Primary Examiner* — Harshad R Patel
*Assistant Examiner* — Samir M Shah
(74) *Attorney, Agent, or Firm* — McDermott Will & Emery LLP

(57) ABSTRACT

A cylinder-to-cylinder variation abnormality detecting device including a rotational fluctuation detecting module that detects a rotational fluctuation among cylinders of a multi-cylinder engine; a rotational fluctuation type abnormality determining module that determines whether a cylinder-to-cylinder variation abnormality is occurring, from the rotational fluctuation; an air-fuel ratio detecting module that detects an air-fuel ratio; an air-fuel ratio fluctuation type abnormality determining module that determines whether the abnormality is occurring, from a fluctuation in the air-fuel ratio; a frequency component type abnormality determining module that detects whether the abnormality is occurring, from a particular frequency component corresponding to one engine combustion cycle; and a cylinder-to-cylinder variation abnormality determination finalizing module that finalizes a determination of the abnormality, if the rotational fluctuation type determining module determines the abnormality and the air-fuel ratio fluctuation type abnormality determining module determines no abnormality.

16 Claims, 8 Drawing Sheets

(51) Int. Cl.
*F02D 41/00* (2006.01)
*F02D 41/28* (2006.01)

(52) U.S. Cl.
CPC .... *F02D 41/0085* (2013.01); *F02D 2041/288* (2013.01); *F02D 2200/1012* (2013.01); *F02D 2200/1015* (2013.01)

(56) References Cited

U.S. PATENT DOCUMENTS

| | | | | |
|---|---|---|---|---|
| 2009/0139213 | A1* | 6/2009 | Mukai | F01N 9/00 60/277 |
| 2009/0211545 | A1* | 8/2009 | Satou | F01M 13/0011 123/41.86 |
| 2010/0168986 | A1* | 7/2010 | Iwazaki | F02D 41/0085 701/103 |
| 2011/0219861 | A1* | 9/2011 | Kayama | F02D 41/22 73/114.72 |
| 2012/0029790 | A1* | 2/2012 | Maruyama | F02D 41/0085 701/103 |
| 2012/0160022 | A1* | 6/2012 | Kimura | F02B 75/041 73/114.72 |
| 2012/0226430 | A1* | 9/2012 | Shinagawa | F02D 41/0065 701/104 |
| 2012/0283931 | A1* | 11/2012 | Otsuka | B60W 30/1882 701/103 |
| 2013/0006505 | A1* | 1/2013 | Shinagawa | F02D 41/0065 701/108 |
| 2013/0118245 | A1* | 5/2013 | Yoshikawa | G01M 15/10 73/114.72 |
| 2013/0253802 | A1* | 9/2013 | Miyamoto | F02D 43/04 701/103 |
| 2014/0129116 | A1* | 5/2014 | Suzuki | F02D 41/1498 701/103 |
| 2014/0288802 | A1* | 9/2014 | Katayama | F02D 41/0085 701/103 |

* cited by examiner

CYLINDER-TO-CYLINDER VARIATION ABNORMALITY DETECTING DEVICE

CROSS-REFERENCE TO RELATED APPLICATIONS

The present application claims priority from Japanese Patent Application No. 2014-047264 filed on Mar. 11, 2014, the entire contents of which are hereby incorporated by reference.

BACKGROUND

1. Technical Field

The present invention relates to a cylinder-to-cylinder variation abnormality detecting device that detects variation in air/fuel ratio for multi-cylinder engine.

2. Related Art

Conventionally, aftertreatment of engine exhaust has been performed using a catalytic converter, or simply "catalyst", to reduce harmful substances included in the engine exhaust gas, such as hydrocarbon (HC), carbon monoxide (CO), and nitroxides (NOx). A three-way catalyst that oxidizes CO and HC and reduces NOx at the same time, so as to be converted into harmless carbon dioxide ($CO_2$), water ($H_2O$), and nitrogen ($N_2$), has come to be used in common in recent years.

To obtain high conversion efficiency using a three-way catalyst, the air/fuel ratio (AFR) of the air-fuel mixture has to be controlled to a narrow range near a theoretical AFR ($\lambda$=1) by AFR feedback control. Accordingly, systems using such three-way catalysts may exhibit poor exhaust emissions if there is cylinder-to-cylinder AFR variation in the engine. Regulations in North America (On Board Diagnostics 2 (OBD-II)) stipulate onboard detection of cylinder-to-cylinder AFR variation abnormalities, since this is a factor causing poorer exhaust emissions.

One convention technique to detect such cylinder-to-cylinder AFR variation abnormalities is the rotational fluctuation method employing fluctuation in engine rotational angle speed (for example, see Japanese Unexamined Patent Application Publication JP-A No. 2012-154300) the AFR fluctuation method using fluctuation in the AFR of the air-fuel mixture detected by an AFR sensor disposed upstream of the catalytic converter (for example, see JP-A No. 2012-31774), and so forth.

Now, cylinder-to-cylinder variation abnormalities include a "rich malfunction" where the amount of fuel in the air-fuel mixture is too great (the air-fuel mixture is rich), and a "lean malfunction" where the amount of fuel in the air-fuel mixture is too small (the air-fuel mixture is lean). The sensitivity of the aforementioned rotational fluctuation method is low regarding rich malfunction. Accordingly, precision of diagnosis has been improved by combining this rotational fluctuation method with the AFR fluctuation method that has higher sensitivity regarding rich malfunction, to confirm an abnormality when a cylinder-to-cylinder variation abnormality has been detected by both methods.

However, if the responsivity of an AFR sensor becomes poor due to deterioration of the AFR sensor over time, or the like, the amplitude of the output waveform of the AFR sensor may becomes smaller, and cylinder-to-cylinder variation abnormalities become more difficult to detect. That is to say, an erroneous determination may be made by the AFR fluctuation method that there is no malfunction, even though cylinder-to-cylinder variation is occurring. In this case, the technique of combining the rotational fluctuation method with the AFR fluctuation method and confirming an abnormality if determination of cylinder-to-cylinder variation abnormality is made in both methods may result in erroneous determination that there is no malfunction, even though cylinder-to-cylinder variation is occurring.

SUMMARY OF THE INVENTION

The present invention has been made in light of the above-described problem, and accordingly it is an object thereof to provide a cylinder-to-cylinder variation abnormality detecting device that detects cylinder-to-cylinder variation abnormalities by combining the rotational fluctuation method and AFR fluctuation method, and accurately detects cylinder-to-cylinder variation abnormalities even if the responsivity of an AFR sensor becomes poor due to deterioration over time, or the like.

An aspect of the present invention provides a cylinder-to-cylinder variation abnormality detecting device, including: a rotational fluctuation detecting module that detects a rotational fluctuation among the cylinders of an engine having at least two or more cylinders; a rotational fluctuation type abnormality determining module that determines whether or not a cylinder-to-cylinder variation abnormality is occurring, based on the rotational fluctuation detected by the rotational fluctuation detecting module; an air-fuel ratio detecting module that detects an air-fuel ratio of an air-fuel mixture, from oxygen content and unburned fuel content in exhaust gas from the engine; an air-fuel ratio fluctuation type abnormality determining module that determines whether or not a cylinder-to-cylinder variation abnormality is occurring, based on fluctuation in the air-fuel ratio detected by the air-fuel ratio detecting module; a frequency component extracting module that extracts a particular frequency component corresponding to an engine combustion cycle, included in rotational fluctuation detected by the rotational fluctuation detecting module; a frequency component type abnormality determining module that determines whether or not a cylinder-to-cylinder variation abnormality is occurring, based on the particular frequency component extracted by the frequency component extracting module; and a cylinder-to-cylinder variation abnormality determination finalizing module that finalizes determination that a cylinder-to-cylinder variation abnormality is occurring, in the case where the rotational fluctuation type abnormality determining module determines that there is an abnormality, and also the air-fuel ratio fluctuation type abnormality determining module determines that there is an abnormality. In the case where the rotational fluctuation type abnormality determining module determines that there is an abnormality but the air-fuel ratio fluctuation type abnormality determining module determines that there is no abnormality, if the frequency component type abnormality determining module determines that there is an abnormality, the cylinder-to-cylinder variation abnormality determination finalizing module finalizes determination that a cylinder-to-cylinder variation abnormality is occurring.

In the case the rotational fluctuation type abnormality determining module determines that there is no abnormality, the cylinder-to-cylinder variation abnormality determination finalizing module may finalize determination that no cylinder-to-cylinder variation abnormality is occurring. In the case where the rotational fluctuation type abnormality determining module determines that there is an abnormality but the air-fuel ratio fluctuation type abnormality determining module determines that there is no abnormality, if the frequency component type abnormality determining module determines that there is no abnormality, the cylinder-to-cylinder variation abnormality determination finalizing module may finalize determination that no cylinder-to-cylinder variation abnormality is occurring.

The rotational fluctuation detecting module may calculate the rotational angle speed between crank angles of $$720°/(\text{number of cylinders}/2)$$

for each of the cylinders of the engine, and detect rotational fluctuation from rotational angle speed difference between some of the cylinders.

The frequency component extracting module may have a band-pass filter that selectively passes a frequency component equivalent to one combustion cycle of the engine, and extract a frequency component equivalent to the one engine combustion cycle of the engine using the band-pass filter.

The frequency component extracting module may extract a frequency component equivalent to the one combustion cycle of the engine when the engine is in an idling state.

In the case where a value obtained by accumulating the square of the frequency component for a predetermined period of time exceeds a predetermined threshold value, the frequency component type abnormality determining module may determine that there is an abnormality.

DETAILED DESCRIPTION

Figure 1:
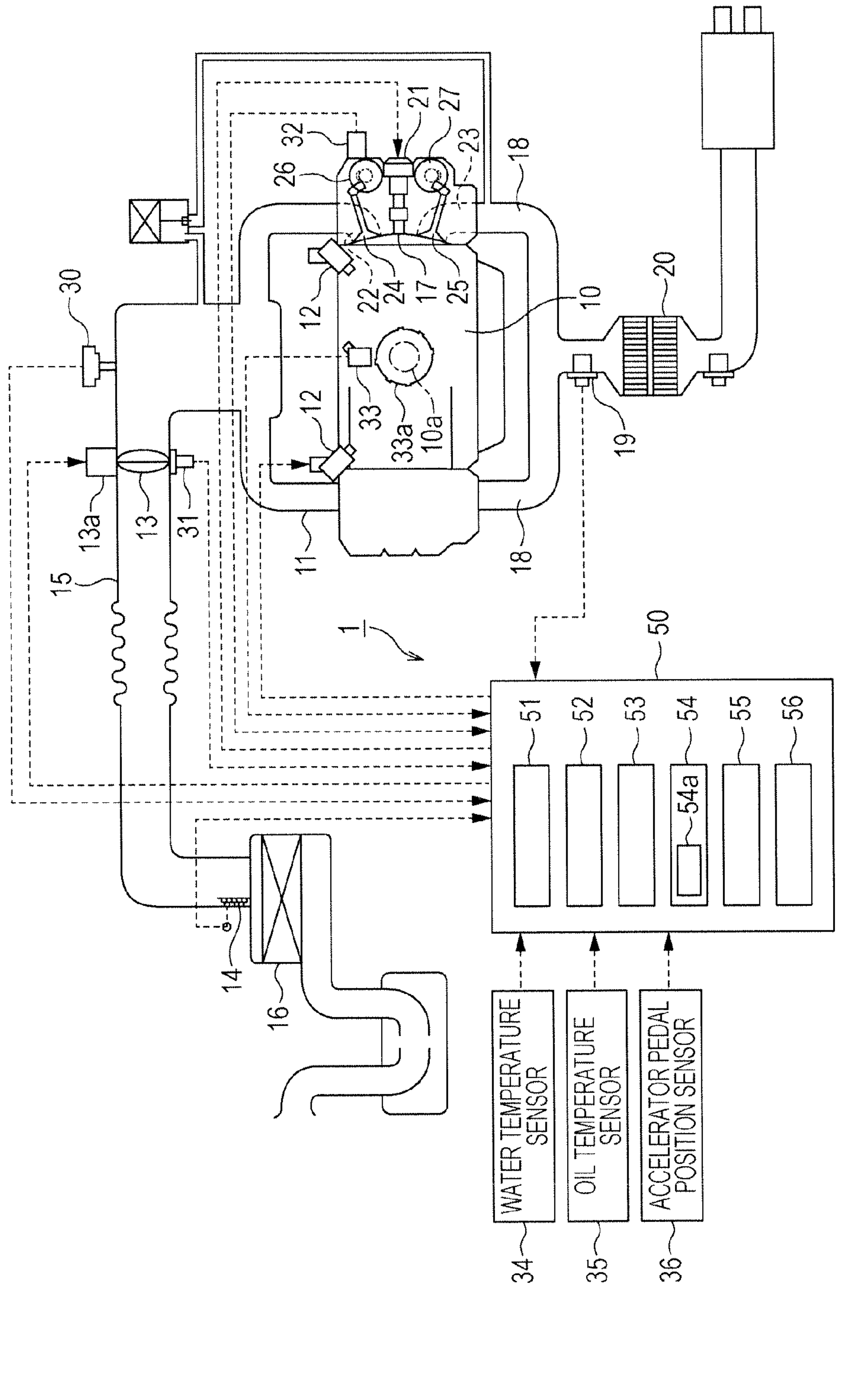
FIG. 1 is a diagram illustrating the configuration of a cylinder-to-cylinder variation abnormality detecting device according to an implementation.

The present inventor has diligently studied the above-described problem, and has found that frequency analysis of rotational fluctuation shows an increase in a particular frequency component being exhibited when cylinder-to-cylinder variation is occurring, as compared to a normal state.

An implementation of the present invention will be described in detail with reference to the drawings. Components that are the same or equivalent in the drawings are denoted with the same reference numerals. The same components in the drawings are denoted with the same reference numerals, and redundant description thereof will be omitted.

First, the configuration of a cylinder-to-cylinder variation abnormality detecting device 1 according to the implementation will be described with reference to FIG. 1. FIG. 1 is a diagram illustrating the configuration of the cylinder-to-cylinder variation abnormality detecting device 1, and an engine 10 to which the cylinder-to-cylinder variation abnormality detecting device 1 has been applied.

The engine 10 is a horizontally-opposed four-cylinder gasoline engine, for example, and more particularly is a gasoline direct injection (GDI) engine where fuel is directly injected into the cylinders. In this engine 10, air that has been drawn in from an air cleaner 16 is throttled by an electronic control throttle valve (hereinafter, simply "throttle valve") 13 provided to an intake pipe 15, passes through an intake manifold 11, and is suctioned into the cylinders formed in the engine 10. The amount of air being drawn in from the air cleaner 16 is detected by an air flow meter 14 disposed between the air cleaner 16 and the throttle valve 13. A collector (surge tank), which is part of the intake manifold 11, includes therein a vacuum sensor 30 to detect intake manifold pressure within the intake manifold 11. The throttle valve 13 also is provided with a throttle position sensor 31 that detects the position of the throttle valve 13.

A cylinder head has an intake port 22 and an exhaust port 23 formed for each cylinder (only one bank illustrated in FIG. 1). Each intake port 22 and exhaust port 23 has an intake valve 24 and an exhaust valve 25, to open and close the intake port 22 and exhaust port 23, respectively. A variable valve timing mechanism 26 is provided between an intake camshaft and an intake cam pulley that drive the intake valve 24. The variable valve timing mechanism 26 steplessly changes the rotational phase (displacement angle) of the intake camshaft as to a crankshaft 10*a* by relatively rotating the intake camshaft and intake cam pulley, thereby advancing/delaying the valve timing (open/close timing) of the intake valve 24. The open/close timing of the intake valve 24 is variably set by the variable valve timing mechanism 26 according to the operating state of the engine.

In the same way, a variable valve timing mechanism 27 is provided between an exhaust camshaft and exhaust cam pulley that drive the exhaust valve 25. The variable valve timing mechanism 27 steplessly changes the rotational phase (displacement angle) of the exhaust camshaft as to the crankshaft 10*a* by relatively rotating the exhaust camshaft and exhaust cam pulley, thereby advancing/delaying the valve timing (open/close timing) of the exhaust valve 25. The open/close timing of the exhaust valve 25 is variably set by the variable valve timing mechanism 27 according to the operating state of the engine.

Each cylinder of the engine 10 is provided with an injector 12 that injects fuel into the cylinder. The injector 12 directly injects fuel, pressurized by a high-pressure fuel pump that is omitted from illustration, into the combustion chamber of the cylinder.

The cylinder head of each cylinder also has a spark plug 17 that ignites the air-fuel mixture, and an ignitor coil 21 that applies high voltage to the spark plug 17, attached thereto. An air-fuel mixture generated from air that has been drawn in and the fuel injected by the injector 12 is ignited by the spark plug 17 in each cylinder of the engine 10 and thus combusted. Exhaust gas after combustion is discharged through an exhaust pipe 18.

To avoid interference of exhaust, the exhaust pipe 18 is arranged so that the No. 1 cylinder (#1) and No. 2 cylinder (#2), and the No. 3 cylinder (#3) and No. 4 cylinder (#4), are each first merged (collected), and then collected into one, which is a 4-2-1 layout. Note that a 4-1 layout or the like may be used instead of the 4-2-1 layout.

An air-fuel ratio sensor 19 is attached downstream of the exhaust pipe 18 and upstream of a later-described catalytic converter 20. A linear air-fuel ration sensor (LAF sensor) that can output signals according to oxygen content and unburned fuel content in the exhaust gas (signals according to the AFR of the air-fuel mixture), and can linearly detect the AFR, is used as the air-fuel ratio sensor 19. The air-fuel ratio sensor 19 (hereinafter also referred to as "LAF sensor") serves as the air-fuel ratio detecting module of the present invention in the implementation.

The catalytic converter 20 is disposed downstream of the LAF sensor 19. The catalytic converter 20 is a three-way catalyst, which oxidizes CO and HC and reduces NOx in the exhaust gas at the same time, thereby purifying harmful gas components in the exhaust gas into harmless carbon dioxide ($CO_2$), water vapor ($H_2O$), and nitrogen gas ($N_2$).

In addition to the above-described air flow meter 14, LAF sensor 19, vacuum sensor 30, and throttle position sensor 31, a cam angle sensor 32 is attached nearby the camshaft of the engine 10, to distinguish cylinders of the engine 10. Also, a crank angle sensor 33 is attached nearby the crankshaft 10*a* of the engine 10 to detect the rotational position of the crankshaft 10*a*. A timing rotor 33*a* is disposed on an end of the crankshaft 10*a*. The timing rotor 33*a* has cog-like protrusions provided every 10 degrees, except for two positions, so there are a total of 34 protrusions, for example. The crank angle sensor 33 detects the rotational position of the crankshaft 10*a* by detecting the presence/absence of protrusions on the timing rotor 33*a*. Magnetic pickup type configurations are preferably used for the cam angle sensor 32 and crank angle sensor 33, for example.

These sensors are connected to a electronic control unit (hereinafter referred to as "ECU") 50. Also connected to the ECU 50 are various types of sensors, such as a water temperature sensor 34 to detect the temperature of coolant water for the engine 10, an oil temperature sensor 35 to detect the temperature of lubricant oil, an acceleration pedal position sensor 36 configured to detect the position of the acceleration pedal, which is the amount by which the acceleration pedal has been depressed, and so forth.

The ECU 50 is configured including a microprocessor that performs computations, read only memory (ROM) that stores programs and so forth so as to cause the microprocessor to execute the various processes, random-access memory (RAM) that stores various types of data such as computation results and so forth, a backup RAM that holds the stored contents by way of a 12 V battery, an input/output interface, and so forth. The ECU 50 also includes an injector driver to drive the injectors 12, and output circuit to output firing signals, a motor driver to drive an electric motor 13*a* that opens and closes the electronically controlled throttle valve 13.

The ECU 50 distinguishes cylinders from the output of the cam angle sensor 32, and calculates the rotational angle speed and the engine revolutions from the output of the crank angle sensor 33. The ECU 50 further obtains various types of information from detection signals input from the various aforementioned sensors, such as air intake amount, air intake pipe negative pressure, accelerator pedal position, AFR of the air-fuel mixture, coolant temperature and oil temperature of the engine 10, and so forth. The ECU 50 also centrally controls the engine 10, by controlling the amount of fuel injection and spark timing, and controlling various devices such as the throttle valve 13, based on the various types of information obtained.

Particularly, the ECU 50 has a function to accurately detect cylinder-to-cylinder variation abnormalities even if the responsivity of the LAP sensor 19 becomes poor due to deterioration over time, or the like. This function is realized by detecting cylinder-to-cylinder variation abnormalities using diagnosis values obtained by performing frequency processing on rotational difference values (called frequency component method), in addition to the above-described rotational fluctuation method and AFR fluctuation method. To this end, the ECU 50 functionally includes a rotational fluctuation detecting module 51, a rotational fluctuation type abnormality determining module 52, an air-fuel ratio fluctuation type abnormality determining module 53, a frequency component extracting module 54, a band-pass filter 54*a*, a frequency component type abnormality determining module 55, and a cylinder-to-cylinder variation abnormality determination finalizing module 56. The functions of the rotational fluctuation detecting module 51, rotational fluctuation type abnormality determining module 52, air-fuel ratio fluctuation type abnormality determining module 53, frequency component extracting module 54, band-pass filter 54*a*, frequency component type abnormality determining module 55, and cylinder-to-cylinder variation abnormality determination finalizing module 56, are realized by the microprocessor of the ECU 50 executing a program stored in the ROM.

The rotational fluctuation detecting module 51 detects cylinder-to-cylinder rotational fluctuations of the engine 10. More specifically, the rotational fluctuation detecting module 51 calculates the rotational angle speed between crank angles of 360° for each cylinder of the engine 10 (360° is obtained by 720°/(4 (number of cylinders)/2)), and detections rotational fluctuation from rotational angle speed difference (360° rotational difference values) between cylinders (between opposing cylinders, such as #1 and #2, #3 and #4, for example). Note that the 360° rotational difference values (rotational fluctuations) detected by the rotational fluctuation detecting module 51 are output to the rotational fluctuation type abnormality determining module 52.

Figure 2:
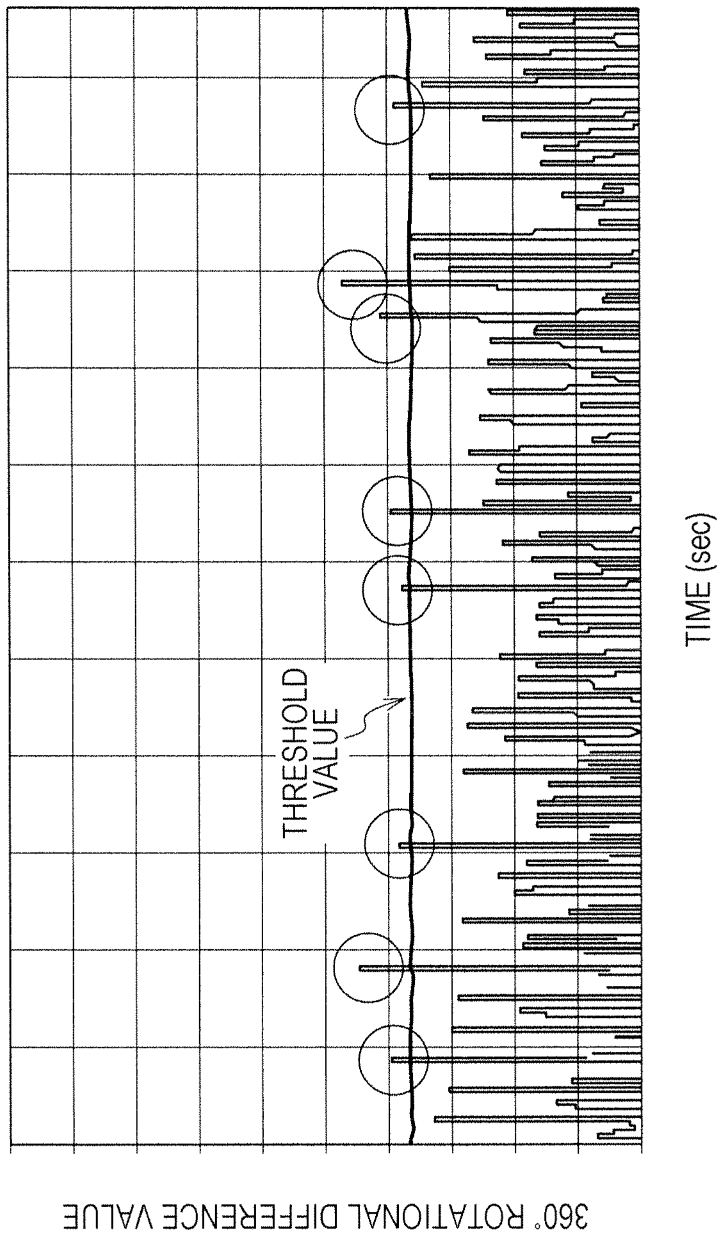
FIG. 2 is a diagram for describing cylinder-to-cylinder variation abnormality detection by the rotational fluctuation method.

The rotational fluctuation type abnormality determining module 52 determines whether or not there are cylinder-to-cylinder variation abnormalities based on the 360° rotational difference values (rotational fluctuations) detected by the rotational fluctuation detecting module 51. More specifically, the rotational fluctuation type abnormality determining module 52 determines that cylinder-to-cylinder variation abnormalities are occurring in the case where the 360° rotational difference values (rotational fluctuations) exceed a predetermined threshold value a certain number of times decided beforehand, as illustrated in FIG. 2. FIG. 2 is a diagram for describing cylinder-to-cylinder variation abnormality detection. The horizontal axis is time in seconds, and the vertical axis is 360° rotational difference values in degrees. The detection results of the rotational fluctuation type abnormality determining module 52, regarding whether or not there are cylinder-to-cylinder variation abnormalities, are output to the cylinder-to-cylinder variation abnormality determination finalizing module 56.

Figure 3:
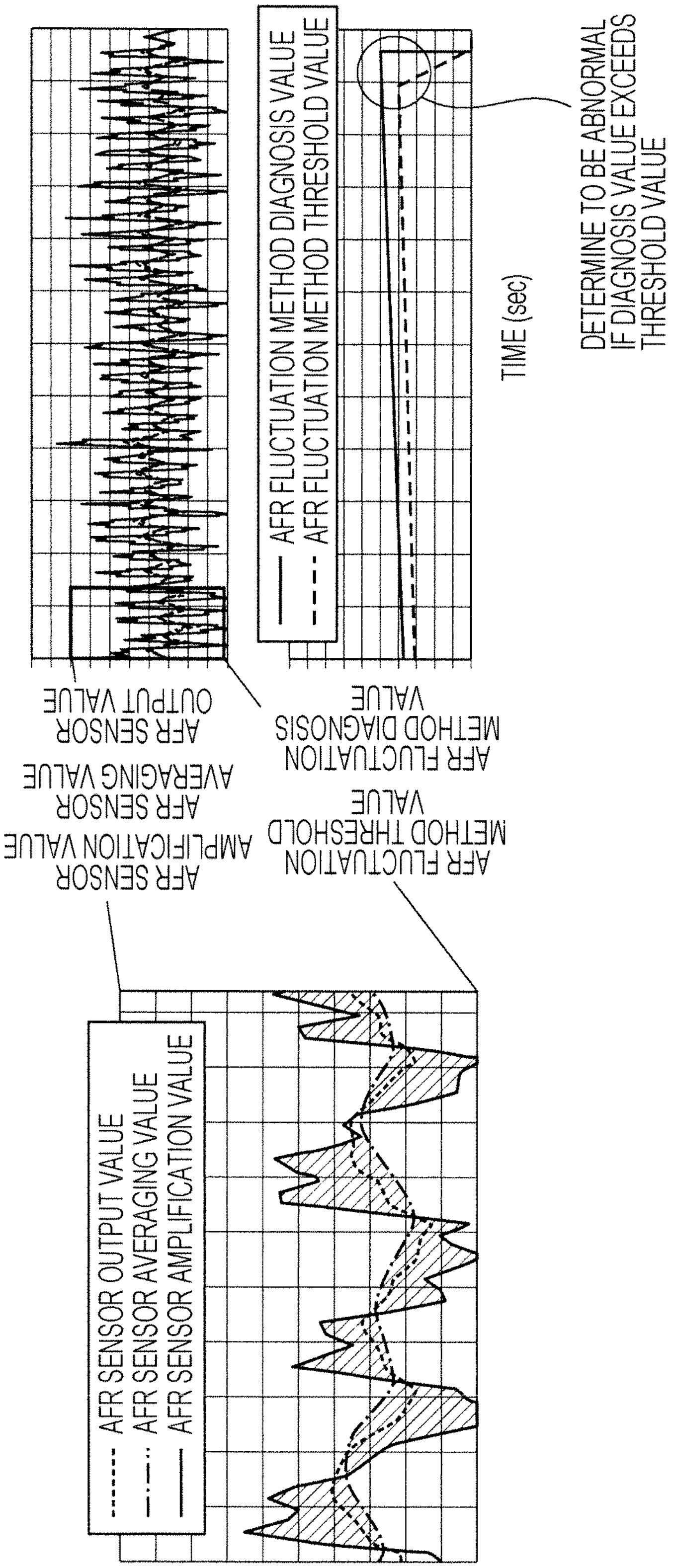
FIG. 3 is a diagram for describing cylinder-to-cylinder variation abnormality detection by the AFR fluctuation method.

The air-fuel ratio fluctuation type abnormality determining module 53 determines whether or not there are cylinder-to-cylinder variation abnormalities, based on the air-fuel ratio fluctuations detected by the LAF sensor 19. More specifically, the air-fuel ratio fluctuation type abnormality determining module 53 accumulates for a predetermined amount of time the area of the difference between the LAF sensor output (waveform, see dashed line in FIG. 3 (enlarged diagram)) that has been amplified (waveform, see solid line in FIG. 3 (enlarged diagram)) and the averaging value of the LAF sensor (waveform, see single-dot dashed line in FIG. 3 (enlarged diagram)). This area (see hatched area in FIG. 3 (enlarged diagram)) accumulated for the predetermined amount of time is taken as a diagnosis value (see solid line in FIG. 3 (lower right)). In the case where the diagnosis value exceeds the threshold value (see dashed line in FIG. 3 (lower right)), determination is made that cylinder-to-cylinder variation abnormalities are occurring. This FIG. 3 is a diagram to describing cylinder-to-cylinder variation abnormalities according to the AFR fluctuation method. The determination results of the air-fuel ratio fluctuation type abnormality determining module 53 (whether or not there are cylinder-to-cylinder variation abnormalities) are output to the cylinder-to-cylinder variation abnormality determination finalizing module 56.

Figure 4A:
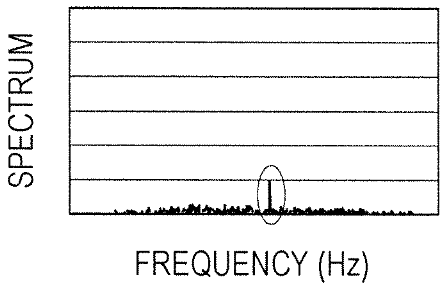
FIGS. 4A through 4C are diagrams illustrating frequency analysis results with regard to 360° rotational difference value when idling.
Figure 4B:
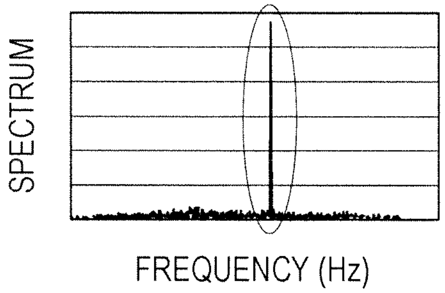
Figure 4C:
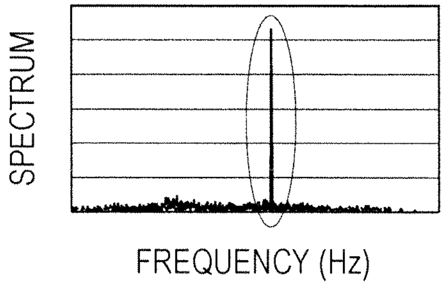

Now, the present inventor has found that, in the case where cylinder-to-cylinder variation abnormalities are determined to be occurring are a result of 360° rotational difference value frequency analysis, an increase in a particular frequency component is exhibited as compared to when running normal. FIGS. 4A through 4C are diagrams illustrating frequency analysis results (fast Fourier transform (FFT) analysis results) on the 360° rotational difference values when idling. The horizontal axis in the graphs in FIGS. 4A through 4C represents frequency (Hz), and the vertical axis represents spectral intensity. In the case where cylinder-to-cylinder variation abnormalities occurs when idling, as illustrated in FIGS. 4B and 4C, a particular component increases are compared to when running normal (FIG. 4A).

Returning to FIG. 1, the frequency component extracting module 54 extracts the particular frequency component corresponding to the combustion cycle of the engine 10, included in the 360° rotational difference values detected by the rotational fluctuation detecting module 51.

Figure 5:
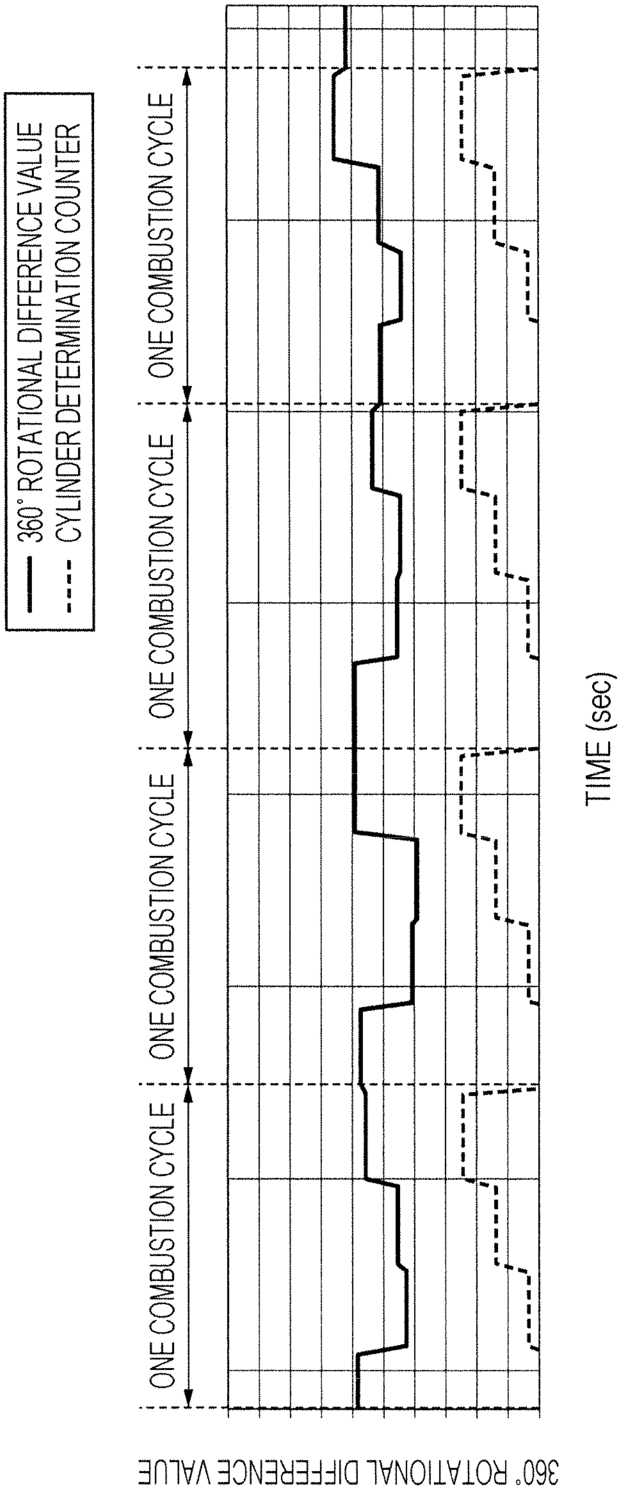
FIG. 5 is a diagram illustrating waveforms with regard to 360° rotational difference value when idling.

Now, it can be seen from FIG. 5 that cylinder-to-cylinder variation abnormalities (rotational fluctuations) fluctuate with one combustion cycle of the engine 10 as one cycle. Accordingly, the extracted frequency component (band) changes depending on the engine revolutions. More specifically, the frequency component extracting module 54 has the band-pass filter (BPF) 54*a* that selectively passes frequency components equivalent to one combustion cycle of the engine 10, and thus extracts frequency components equivalent to the one combustion cycle of the engine 10 using the band-pass filter 54*a*. FIG. 5 is a diagram illustrating the waveform of 360° rotational difference values. The horizontal axis in FIG. 5 is time in seconds, and the vertical axis is 360° rotational difference values.

Also, the frequency component (band) to be extracted changes depending on the engine revolutions as described above, so the frequency component extracting module 54 preferably extracts the frequency component equivalent to one combustion cycle of the engine 10 when the engine 10 is idling, in order to extract the desired component in a more stable manner. If the engine revolutions when idling are 800 rpm for example, the amount of time necessary for one combustion cycle is 800 rpm=400 cycles/min=6.667 Hz. Accordingly, the band-pass frequency band is set so as to extract frequency components of this band.

Also, a filter output value addition expression in Expression (1) is used in the implementation as the band-pass filter 54*a*, for example, $$y(n)=x(n)\times h(0)+x(n-1)\times h(1)+\ldots+x(n-N)\times h(N) \quad (1)$$

where h(0) through h(N) are filter functions, x(n) through x(n−N) are 360° rotational difference values, and y(n) is a filter output value. Note that the frequency component extracted by the frequency component extracting module 54 (which is to say, output from the band-pass filter 54*a*) is output to the frequency component type abnormality determining module 55.

Figure 6:
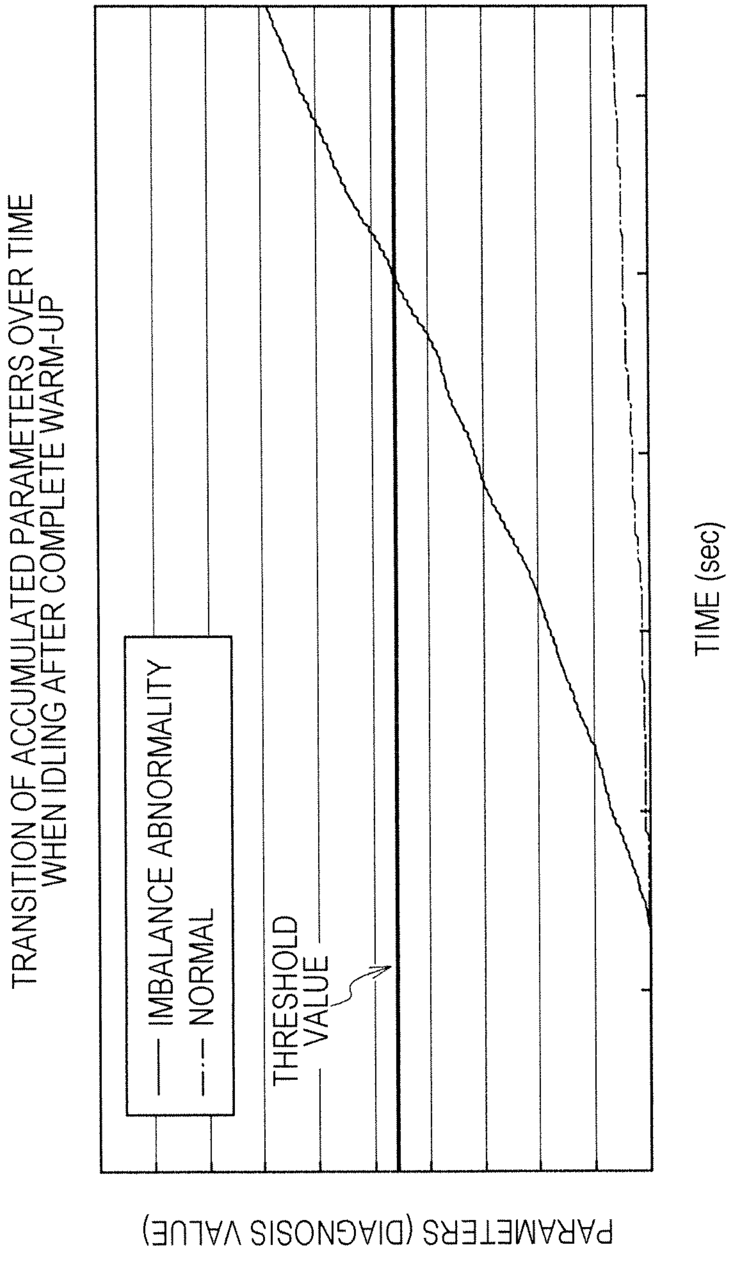
FIG. 6 is a diagram for describing cylinder-to-cylinder variation abnormality detection by accumulated values (diagnosis values) of frequency components.

The frequency component type abnormality determining module 55 determines whether or not there are cylinder-to-cylinder variation abnormalities, based on the frequency component extracted by the frequency component extracting module 54. More specifically, the frequency component type abnormality determining module 55 determines that cylinder-to-cylinder variation abnormalities are occurring in the case where the value obtained by accumulating the square or the frequency component for a predetermined amount of time (diagnosis value) exceeds a predetermined threshold value, as illustrated in FIG. 6. FIG. 6 is a diagram for describing cylinder-to-cylinder variation abnormality detection by accumulated value of particular frequency component (diagnosis value). The horizontal axis in FIG. 6 is time in seconds, and the vertical axis is diagnosis value (parameters). The data from cylinder-to-cylinder variation abnormalities is illustrated by a solid line, and normal data is illustrated by a single-dot dashed line in FIG. 6. The determination results (of whether or not there are cylinder-to-cylinder variation abnormalities) from the frequency component type abnormality determining module 55 are output to the cylinder-to-cylinder variation abnormality determination finalizing module 56.

The cylinder-to-cylinder variation abnormality determination finalizing module 56 finalizes whether or not there are cylinder-to-cylinder variation abnormalities, based on the determination results from the rotational fluctuation type abnormality determining module 52, the air-fuel ratio fluctuation type abnormality determining module 53, and the frequency component type abnormality determining module 55. More specifically, in the case where the rotational fluctuation type abnormality determining module 52 has determined that there is no abnormality, the cylinder-to-cylinder variation abnormality determination finalizing module 56 makes a final determination that no abnormalities are occurring. On the other hand, in the case where the rotational fluctuation type abnormality determining module 52 has determined that abnormalities are occurring, and also the air-fuel ratio fluctuation type abnormality determining module 53 has determined that abnormalities are occurring, the cylinder-to-cylinder variation abnormality determination finalizing module 56 makes a final determination that cylinder-to-cylinder variation abnormalities are occurring.

Also, in the case where the rotational fluctuation type abnormality determining module 52 has determined that abnormalities are occurring, the air-fuel ratio fluctuation type abnormality determining module 53 has determined that no abnormalities are occurring, and the frequency component type abnormality determining module 55 has determined that abnormalities are occurring, the cylinder-to-cylinder variation abnormality determination finalizing module 56 makes a final determination that cylinder-to-cylinder variation abnormalities are occurring.

Further, in the case where the rotational fluctuation type abnormality determining module 52 has determined that abnormalities are occurring, the air-fuel ratio fluctuation type abnormality determining module 53 has determined that no abnormalities are occurring, and the frequency component type abnormality determining module 55 has determined that no abnormalities are occurring, the cylinder-to-cylinder variation abnormality determination finalizing module 56 makes a final determination that no cylinder-to-cylinder variation abnormalities are occurring.

Figure 7:
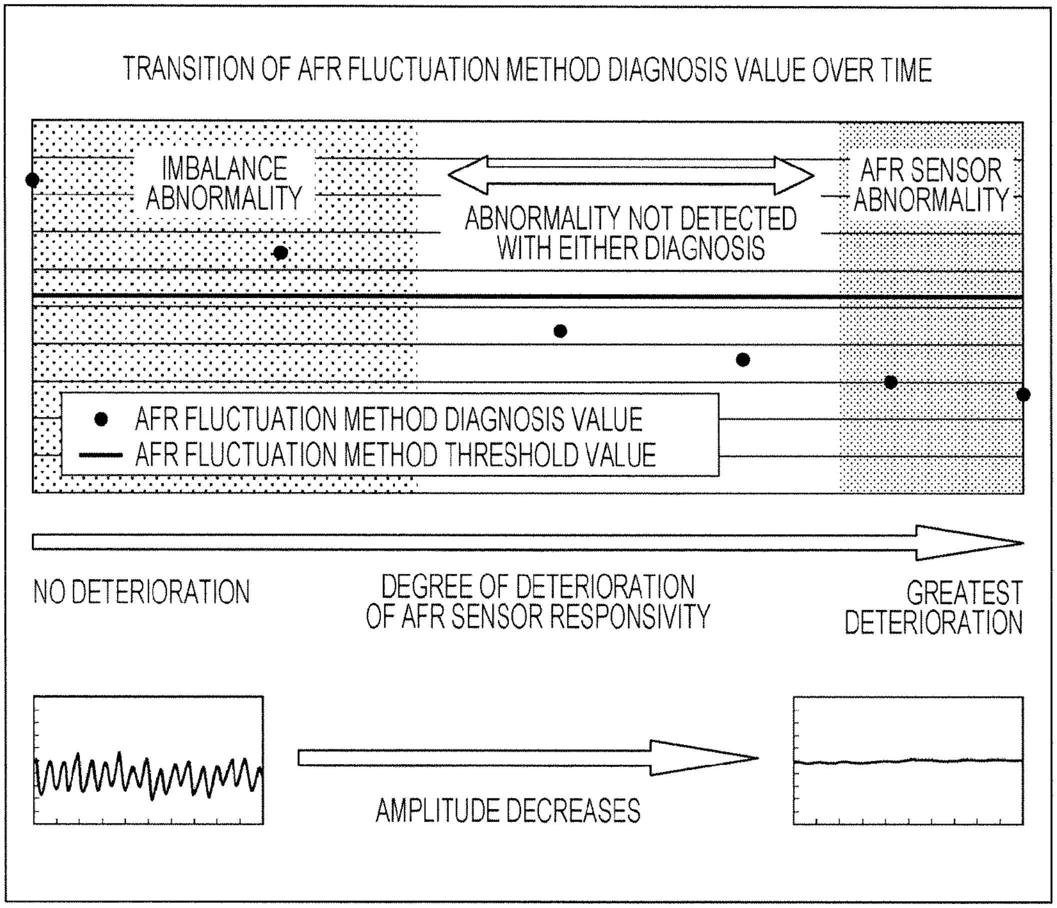
FIG. 7 is a diagram illustrating the relationship between the degree of deterioration in responsivity in an AFR sensor, and transition of diagnosis values, in the AFR fluctuation method.

FIG. 7 illustrates the relationship between the degree of responsivity deterioration of the LAF sensor 19 and the diagnosis value, in the AFR fluctuation method. As the responsivity of the LAF sensor 19 becomes poorer, the amplitude of cyclic vibration particular to occurrence of cylinder-to-cylinder variation abnormalities decreases (or no vibrations are output), as illustrated in FIG. 7. As a result, the diagnosis value becomes small, and an erroneous normal determination may be made even though cylinder-to-cylinder variation abnormalities are occurring. Now, a case where the degree of deterioration of the LAF sensor 19 is great may be recognized as a sensor abnormality (failure), but if the degree of deterioration does not reach that for a sensor abnormality (failure), and a region is created where the state of the sensor is not recognized as being a sensor abnormality (failure), and cylinder-to-cylinder variation abnormalities cannot be detected. The implementation enables cylinder-to-cylinder variation abnormalities to be detected in a sure manner even at such a degree of deterioration.

Figure 8:
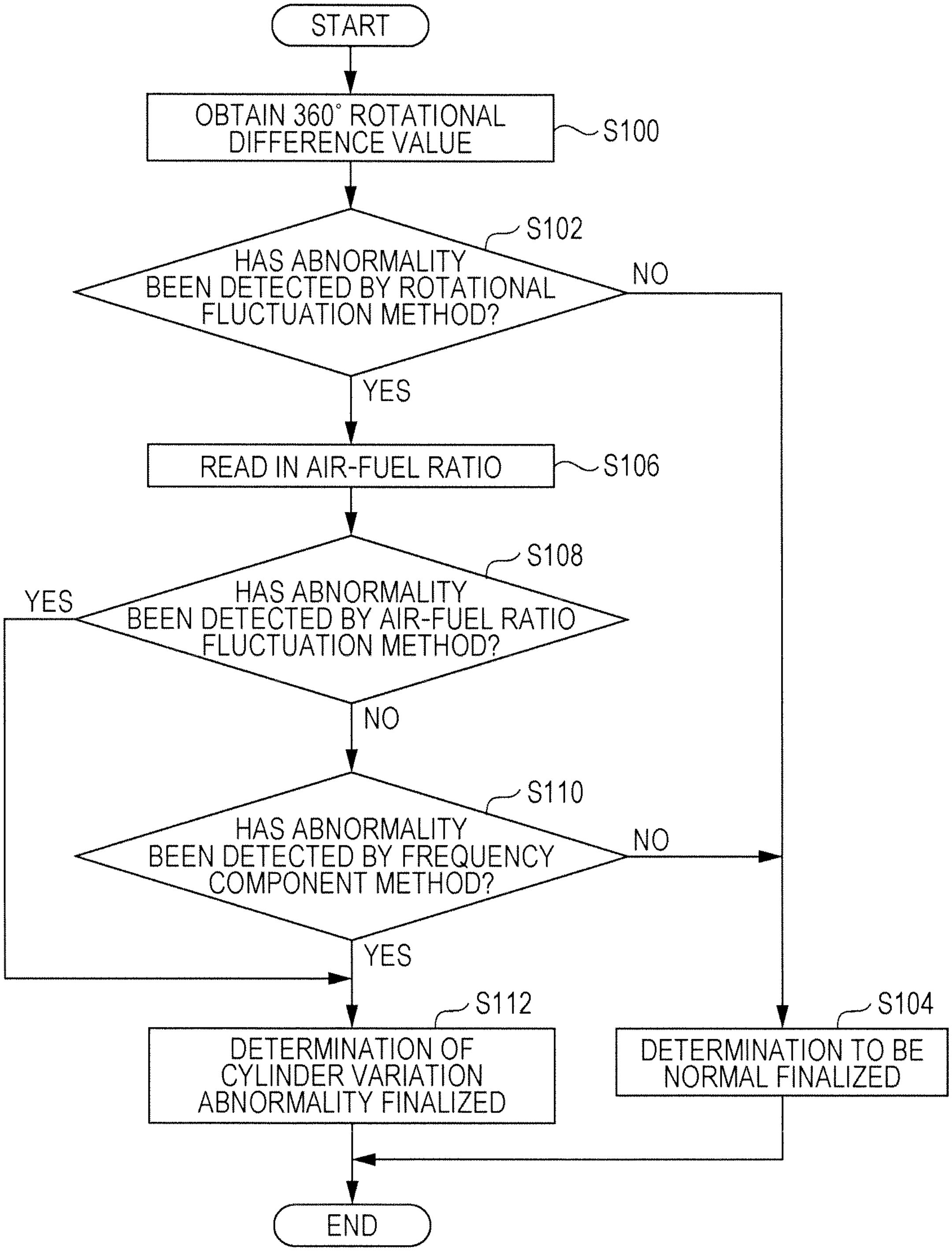
FIG. 8 is a flowchart illustrating processing procedures in cylinder-to-cylinder variation abnormality detection by the cylinder-to-cylinder variation abnormality detecting device according to the implementation.

Next, the operations of the cylinder-to-cylinder variation abnormality detecting device 1 will be described with reference to FIG. 8. FIG. 8 is a flowchart illustrating processing procedures for cylinder-to-cylinder variation abnormality detecting processing by the cylinder-to-cylinder variation abnormality detecting device 1. This processing is repeatedly executed at the ECU 50 at a predetermined timing.

First, in step S100, the rotational angle speed is calculated among 360° crank angles for each cylinder of the engine 10, thereby obtaining the rotational difference value among the cylinders (between opposing cylinders, such as #1 and #2, #3 and #4, for example), which is the 360° rotational difference value.

Next, in step S102 determination is made regarding whether or not cylinder-to-cylinder variation abnormalities have been detected by the rotational fluctuation method, based on the 360° rotational difference value obtained in step S100. The cylinder-to-cylinder variation abnormality detection method using the rotational fluctuation method is as described above, so detailed description thereof will be omitted here. In the case where a cylinder-to-cylinder variation abnormality is detected by the rotational fluctuation method, the flow advances to step S106. On the other hand, in the case where a cylinder-to-cylinder variation abnormality is not detected by the rotational fluctuation method, the flow advances to step S104 where determination is finalized that there is no cylinder-to-cylinder variation abnormality occurring (i.e., that the state is normal), and the flow ends.

In step S106, the AFR detected by the LAF sensor 19 is read in. In the following step S108, determination is made regarding whether or not a cylinder-to-cylinder variation abnormality has been detected by the AFR fluctuation method, based on fluctuation in AFR read in step S106. The cylinder-to-cylinder variation abnormality detection method using the AFR fluctuation method is as described above, so detailed description thereof will be omitted here. In the case where a cylinder-to-cylinder variation abnormality is not detected by the AFR fluctuation method, the flow advances to step S110. On the other hand, in the case where a cylinder-to-cylinder variation abnormality is detected by the AFR fluctuation method, the flow advances to step S112 where determination is finalized that there is cylinder-to-cylinder variation abnormality occurring (i.e., that the state is abnormal), and the flow ends.

In step S110, determination is made regarding whether or not a cylinder-to-cylinder variation abnormality has been detected by the frequency component method, based on the 360° rotational difference value obtained in step S100. The cylinder-to-cylinder variation abnormality detection method using the frequency component method is as described above, so detailed description thereof will be omitted here. In the case where a cylinder-to-cylinder variation abnormality is not detected by the frequency component method, the flow advances to step S104 where determination is finalized that there is no cylinder-to-cylinder variation abnormality occurring (i.e., that the state is normal), and the flow ends. On the other hand, in the case where a cylinder-to-cylinder variation abnormality is detected by the frequency component method, the flow advances to step S112 where determination is finalized that there is cylinder-to-cylinder variation abnormality occurring (i.e., that the state is abnormal), and the flow ends.

As described above in detail, according to the implementation, in addition to the rotational fluctuation type abnormality determining module 52 that determines whether or not a cylinder-to-cylinder variation abnormality is occurring, based on the 360° rotational difference value (rotational fluctuation), and the air-fuel ratio fluctuation type abnormality determining module 53 that determines whether or not a cylinder-to-cylinder variation abnormality is occurring, based on fluctuation in the air-fuel ratio, a frequency component type abnormality determining module 55 that detects whether or not a cylinder-to-cylinder variation abnormality is occurring, based on the particular frequency component corresponding to the combustion cycle of the engine 10 included in the 360° rotational difference value (rotational fluctuation). In the case where determination is made by the rotational fluctuation type abnormality determining module 52 that there is an abnormality, determination that there is a cylinder-to-cylinder variation abnormality is finalized if the frequency component type abnormality determining module 55 determines that there is an abnormality, even if the air-fuel ratio fluctuation type abnormality determining module 53 determines that there is no abnormality. Accordingly, even in the case where responsivity of the LAF sensor 19 deteriorates due to passage of time or the like to where it cannot detect cylinder-to-cylinder variation abnormalities anymore (i.e., even in the case where erroneous determination of a normal state is made in the AFR fluctuation method regardless of cylinder-to-cylinder variation occurring), accurate cylinder-to-cylinder variation abnormality determination can be performed. Accordingly, cylinder-to-cylinder variation abnormalities can be detected in a sure manner even in the case where responsivity of the LAF sensor 19 has deteriorated due to passage of time or the like.

Now, in the case where determination has been made by the air-fuel ratio fluctuation type abnormality determining module 53 that there is no abnormality, and also determination is made by the frequency component type abnormality determining module 55 that there is no abnormality, there is a high probability that there is no deterioration of the LAF sensor 19 (responsivity has not deteriorated), and that the determination results of the air-fuel ratio fluctuation type abnormality determining module 53 are correct. In such a case, even if the rotational fluctuation type abnormality determining module 52 makes a determination that there is an abnormality, erroneous detection can be appropriately prevented by finalizing determination that no cylinder-to-cylinder variation abnormality is occurring.

According to the implementation, the rotational angle speed between crank angles of 360° is calculated for each cylinder of the engine 10, and rotational fluctuation is detected from rotational angle speed difference between cylinders (360° rotational difference value). Accordingly, rotational fluctuation between cylinders can be obtained in a precise manner.

According to the implementation, a frequency component equivalent to one combustion cycle of the engine 10 is extracted from the 360° rotational difference value (waveform) by the band-pass filter 54*a*, so the frequency component particular to cylinder-to-cylinder variation abnormality can be extracted, and determination of whether or not a cylinder-to-cylinder variation abnormality is occurring can be determined in a precise manner.

Also, according to the implementation, in the case where the engine 10 is in an idling state, i.e., in the case where engine revolutions are generally stable, a frequency component equivalent to one combustion cycle of the engine 10 is extracted, thereby enabling the frequency component characteristic to occurrence of cylinder-to-cylinder variation abnormalities to be accurately extracted.

While an implementation of the present invention has been described, the present invention is not restricted to the above implementation, and various modifications may be made. For example, the implementation has been described with regard to an example of applying the present invention to a four cylinder engine, but the present invention is not restricted to a four cylinder engine, and can be applied to any engine that has two or more cylinders. Also, the present invention is not restricted to application to a horizontally opposed engine, and may be applied to an inline engine or V engine.

In the implementation, the rotational angle speed between crank angles of 360° is calculated for each cylinder of the engine 10, and rotational angle speed difference (360° rotational difference value) is detected between cylinders (between opposing cylinders), but the crank angle intervals regarding which rotational angle speed difference are not restricted to a 360° crank angle, and can be optionally set according to conditions. Also, while the crank angle 360° has been set in the above-described implementation regarding a case of a four-cylinder engine, but in the case of an engine of which the number of cylinders is other than four, this is preferably changed according to the number of cylinders, by (720°/(number of cylinders/2)).

While the frequency component equivalent to one combustion cycle of the engine 10 has been extracted from the 360° rotational difference value using the band-pass filter 54*a* in the above-described implementation, a configuration may be made where the spectral intensity of the frequency is obtained by frequency analysis using FFT for example, so as to determine whether or not a cylinder-to-cylinder variation abnormality is occurring depending on the spectral intensity.

While the implementation has been described above with regard to an example of a case of applying the present invention to a gasoline direct injection engine, the present invention can be applied to a port fuel injection engine as well.

The invention claimed is:

1. A cylinder-to-cylinder variation abnormality detecting device, comprising:

a rotational fluctuation detecting module that detects a rotational fluctuation among cylinders of an engine having at least two or more cylinders;

a rotational fluctuation type abnormality determining module that determines whether or not a cylinder-to-cylinder variation abnormality is occurring, based on the rotational fluctuation detected by the rotational fluctuation detecting module;

an air-fuel ratio detecting module that detects an air-fuel ratio of an air-fuel mixture, from oxygen content and unburned fuel content in an exhaust gas from the engine;

an air-fuel ratio fluctuation type abnormality determining module that determines whether or not the cylinder-to-cylinder variation abnormality is occurring, based on a fluctuation in the air-fuel ratio detected by the air-fuel ratio detecting module;

a frequency component extracting module that extracts a particular frequency component corresponding to an engine combustion cycle, included in the rotational fluctuation detected by the rotational fluctuation detecting module;

a frequency component type abnormality determining module that determines whether or not the cylinder-to-cylinder variation abnormality is occurring, based on the particular frequency component extracted by the frequency component extracting module; and a cylinder-to-cylinder variation abnormality determination finalizing module that finalizes a determination that the cylinder-to-cylinder variation abnormality is occurring, in the case where the rotational fluctuation type abnormality determining module determines that the cylinder-to-cylinder variation abnormality is there, and also the air-fuel ratio fluctuation type abnormality determining module determines that the cylinder-to-cylinder variation abnormality is there, wherein, in the case where the rotational fluctuation type abnormality determining module determines that the cylinder-to-cylinder variation abnormality is there but the air-fuel ratio fluctuation type abnormality determining module determines that there is no abnormality, if the frequency component type abnormality determining module determines that the cylinder-to-cylinder variation abnormality is there, the cylinder-to-cylinder variation abnormality determination finalizing module finalizes the determination that the cylinder-to-cylinder variation abnormality is occurring.

2. The cylinder-to-cylinder variation abnormality detecting device according to claim 1, wherein, in the case where the rotational fluctuation type abnormality determining module determines that there is no abnormality, the cylinder-to-cylinder variation abnormality determination finalizing module finalizes a determination that the cylinder-to-cylinder variation abnormality is not occurring, and wherein, in the case where the rotational fluctuation type abnormality determining module determines that the cylinder-to-cylinder variation abnormality is there but the air-fuel ratio fluctuation type abnormality determining module determines that there is no abnormality, if the frequency component type abnormality determining module determines that there is no abnormality, the cylinder-to-cylinder variation abnormality determination finalizing module finalizes determination that no cylinder-to-cylinder variation abnormality is occurring.

3. The cylinder-to-cylinder variation abnormality detecting device according to claim 2, wherein the rotational fluctuation detecting module calculates a rotational angle speed between crank angles of 720°/(number of cylinders/2)

for each of the two or more of the engine, and detects rotational fluctuation from respective differences between the respective rotational angle speeds of at least some of the two or more cylinders.

4. The cylinder-to-cylinder variation abnormality detecting device according to claim 3, wherein the frequency component extracting module has a band-pass filter that selectively passes a frequency component equivalent to one combustion cycle of the engine, and extracts the frequency component equivalent to the one combustion cycle of the engine using the band-pass filter.

5. The cylinder-to-cylinder variation abnormality detecting device according to claim 4, wherein the frequency component extracting module extracts the frequency component equivalent to the one combustion cycle of the engine when the engine is in an idling state.

6. The cylinder-to-cylinder variation abnormality detecting device according to claim 3, wherein, in the case where a value obtained by accumulating the square of the frequency component for a predetermined period of time exceeds a predetermined threshold value, the frequency component type abnormality determining module determines that the cylinder-to-cylinder variation abnormality is there.

7. The cylinder-to-cylinder variation abnormality detecting device according to claim 2, wherein the frequency component extracting module has a band-pass filter that selectively passes a frequency component equivalent to one combustion cycle of the engine, and extracts the frequency component equivalent to the one combustion cycle of the engine using the band-pass filter.

8. The cylinder-to-cylinder variation abnormality detecting device according to claim 7, wherein the frequency component extracting module extracts the frequency component equivalent to the one combustion cycle of the engine when the engine is in an idling state.

9. The cylinder-to-cylinder variation abnormality detecting device according to claim 2, wherein, in the case where a value obtained by accumulating the square of the frequency component for a predetermined period of time exceeds a predetermined threshold value, the frequency component type abnormality determining module determines that the cylinder-to-cylinder variation abnormality is there.

10. The cylinder-to-cylinder variation abnormality detecting device according to claim 1, wherein the rotational fluctuation detecting module calculates a rotational angle speed between crank angles of 720°/(number of cylinders/2)

for each of the two or more of the engine, and detects rotational fluctuation from respective differences between the respective rotational angle speeds of at least some of the two or more cylinders.

11. The cylinder-to-cylinder variation abnormality detecting device according to claim 10, wherein the frequency component extracting module has a band-pass filter that selectively passes a frequency component equivalent to one combustion cycle of the engine, and extracts the frequency component equivalent to the one combustion cycle of the engine using the band-pass filter.

12. The cylinder-to-cylinder variation abnormality detecting device according to claim 11, wherein the frequency component extracting module extracts the frequency component equivalent to the one combustion cycle of the engine when the engine is in an idling state.

13. The cylinder-to-cylinder variation abnormality detecting device according to claim 10, wherein, in the case where a value obtained by accumulating the square of the frequency component for a predetermined period of time exceeds a predetermined threshold value, the frequency component type abnormality determining module determines that the cylinder-to-cylinder variation abnormality is there.

14. The cylinder-to-cylinder variation abnormality detecting device according to claim 1, wherein the frequency component extracting module has a band-pass filter that selectively passes a frequency component equivalent to one combustion cycle of the engine, and extracts the frequency component equivalent to the one combustion cycle of the engine using the band-pass filter.

15. The cylinder-to-cylinder variation abnormality detecting device according to claim 14, wherein the frequency component extracting module extracts the frequency component equivalent to the one combustion cycle of the engine when the engine is in an idling state.

16. The cylinder-to-cylinder variation abnormality detecting device according to claim 1, wherein, in the case where a value obtained by accumulating the square of the frequency component for a predetermined period of time exceeds a predetermined threshold value, the frequency component type abnormality determining module determines that the cylinder-to-cylinder variation abnormality is there.

* * * * *